United States Patent
McDonald et al.

(10) Patent No.: US 10,887,217 B2
(45) Date of Patent: Jan. 5, 2021

(54) ROUTING PACKETS BASED ON CONGESTION METRIC THRESHOLDS AND WEIGHTS

(71) Applicant: HEWLETT PACKARD ENTERPRISE DEVELOPMENT LP, Houston, TX (US)

(72) Inventors: Nicholas George McDonald, Ft. Collins, CO (US); Adriana B. Flores Miranda, Ft. Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 6 days.

(21) Appl. No.: 16/022,744

(22) Filed: Jun. 29, 2018

(65) Prior Publication Data

US 2020/0007432 A1    Jan. 2, 2020

(51) Int. Cl.
| | |
|---|---|
| *H04L 12/721* | (2013.01) |
| *H04L 12/707* | (2013.01) |
| *H04L 12/947* | (2013.01) |
| *H04L 12/733* | (2013.01) |
| *H04L 12/803* | (2013.01) |

(52) U.S. Cl.
CPC .......... *H04L 45/123* (2013.01); *H04L 45/122* (2013.01); *H04L 45/22* (2013.01); *H04L 47/122* (2013.01); *H04L 49/258* (2013.01)

(58) Field of Classification Search
None
See application file for complete search history.

(56) References Cited

U.S. PATENT DOCUMENTS

| | | | | |
|---|---|---|---|---|
| 5,430,729 A | * | 7/1995 | Rahnema | H04B 7/1856 370/409 |
| 7,362,703 B1 | * | 4/2008 | Taft | H04L 45/06 370/230 |
| 7,492,722 B2 | | 2/2009 | Pietraski et al. | |
| 9,036,481 B1 | * | 5/2015 | White | H04L 47/18 370/235 |
| 9,137,143 B2 | | 9/2015 | Parker et al. | |
| 9,577,918 B2 | | 2/2017 | Bataineh et al. | |

(Continued)

OTHER PUBLICATIONS

Faizian, P. et al.; "Traffic Pattern-based Adaptive Routing for Intra-group Communication in Dragonfly Networks"; Aug. 24-26, 2016; 8 pages.

(Continued)

*Primary Examiner* — Andre Tacdiran
(74) *Attorney, Agent, or Firm* — Trop, Pruner & Hu, P.C.

(57) ABSTRACT

A technique includes receiving a packet at a network device, wherein the packet is to be routed in a network to a destination network device; determining a plurality of candidate routes for the packet to be routed to the destination network device; grouping the plurality of candidate routes into a first set of candidate routes and a second set of candidate routes based on hop counts associated with the plurality of candidate routes; selecting one of the first or second sets based on a congestion metric threshold; selecting a candidate route from the selected first or second set based on weight metric values associated with the candidate routes of the selected first or second set; and selecting an egress port associated with the selected candidate route.

14 Claims, 6 Drawing Sheets

(56) References Cited

U.S. PATENT DOCUMENTS

| | | | |
|---|---|---|---|
| 2003/0133410 A1* | 7/2003 | Kang | H04L 41/0213 370/230 |
| 2003/0179704 A1* | 9/2003 | Lakkakorpi | H04L 47/125 370/230 |
| 2003/0231599 A1* | 12/2003 | Umezawa | H04L 45/00 370/238 |
| 2004/0087311 A1* | 5/2004 | Haglund | H04L 47/125 455/453 |
| 2006/0067235 A1* | 3/2006 | Acharya | H04J 3/1617 370/238 |
| 2006/0088063 A1* | 4/2006 | Hartung | H04L 43/087 370/498 |
| 2006/0268879 A1* | 11/2006 | Xhafa | H04L 45/123 370/392 |
| 2007/0280113 A1* | 12/2007 | Ninan | H04L 41/22 370/235 |
| 2008/0107075 A1* | 5/2008 | Ramachandran | H04L 45/124 370/331 |
| 2009/0003195 A1* | 1/2009 | Pitchforth, Jr. | H04L 45/22 370/218 |
| 2009/0168653 A1* | 7/2009 | St. Pierre | H04L 45/00 370/238 |
| 2010/0061264 A1* | 3/2010 | Campbell | H04L 45/124 370/253 |
| 2010/0260191 A1* | 10/2010 | Hiie | H04L 45/3065 370/400 |
| 2010/0262709 A1* | 10/2010 | Hiie | H04L 45/121 709/231 |
| 2012/0057467 A1* | 3/2012 | Yoshida | H04L 47/283 370/238 |
| 2013/0022353 A1* | 1/2013 | Shimizu | H04L 45/123 398/34 |
| 2014/0112144 A1* | 4/2014 | Takazoe | H04W 40/248 370/235 |
| 2014/0140341 A1* | 5/2014 | Bataineh | H04L 45/20 370/389 |
| 2015/0043915 A1* | 2/2015 | Patel | H04L 45/302 398/68 |
| 2015/0127797 A1* | 5/2015 | Attar | H04L 47/125 709/223 |
| 2016/0065447 A1* | 3/2016 | Khan | H04L 47/22 370/237 |
| 2016/0294694 A1 | 10/2016 | Parker et al. | |
| 2017/0126544 A1* | 5/2017 | Vigneras | H04L 45/02 |
| 2017/0222914 A1 | 8/2017 | Fedyk | |
| 2017/0295100 A1* | 10/2017 | Hira | H04L 43/0864 |
| 2018/0006945 A1 | 1/2018 | Flajslik et al. | |
| 2018/0006946 A1* | 1/2018 | Flajslik | H04L 43/08 |
| 2018/0097725 A1* | 4/2018 | Wood | H04L 45/60 |
| 2019/0081884 A1* | 3/2019 | Spohn | H04L 63/061 |
| 2019/0086224 A1* | 3/2019 | Sharma | G01C 21/3415 |
| 2019/0245346 A1* | 8/2019 | Barker | H02J 1/12 |

OTHER PUBLICATIONS

Mubarak, M. et al.; "Modeling a Million-node Dragonfly Network Using Massively Parallel Discrete-event Simulation"; Nov. 10-16, 2012; 11 pages.

Touati, H. et al.; "A Weighted Minimal Fully Adaptive Congestion Aware Routing Algorithm for Network on Chip"; Feb. 8, 2018; 5 pages.

* cited by examiner

ROUTING PACKETS BASED ON CONGESTION METRIC THRESHOLDS AND WEIGHTS

STATEMENT OF GOVERNMENT RIGHTS

This invention was made with Government support under Prime Contract No. DE-AC52-07NA27344 awarded by DOE. The Government has certain rights in this invention.

BACKGROUND

Routing algorithms (e.g., Universal Globally Adaptive Load-Balancing (UGAL) routing algorithms) may make use of weighted decisions based on congestion metrics and hop counts to route data packets through nodes in a network. In this manner, when a given network device receives a data packet, the given network device may apply such a routing algorithm to evaluate candidate paths, or routes, between the given network device and the packet's destination. In making this evaluation, the network device may calculate a weight for each candidate route, which approximates the delay, or latency, for the route; and the network device may, for example, select the candidate route for the packet, which has the lowest weight (i.e., select the route that appears to have the lowest latency).

DETAILED DESCRIPTION

In accordance with example systems and techniques that are described herein, a routing engine of a source network device (a router or a switch, as examples) may make a routing decision to route a given incoming data packet to a destination network device (another switch or router, as examples), and in doing so, the routing engine may consider multiple possible candidate paths, or routes, between the source network device and the destination network device. In this context, a "source network device" refers to any network device that communicates, or transmits, a data packet to another network device; and the source network device may have one or multiple routing engines (a routing engine per ingress port, for example). The source network device may be an endpoint, i.e., the originating network device for the data packet, as well as another other network device between the originating network device and the final, destination network device for the data packet. The "destination network device" as used herein, refers to the network device that serves as the final destination for the data packet.

In accordance with some implementations, the network devices, such as the source network device, and the destination network device may be devices that are disposed in a single die, on multiple dies of a single semiconductor package (or "chip"). In this manner, the network devices may be part of an on chip network between, for example, switchlet application specific integrated circuits (ASICs). In accordance with further example implementations, the network devices may be part of a network of separate devices, such as devices that are disposed on different semiconductor devices and may include, for example, networks that include standalone switches, routers, bridges, and so forth. Moreover, the network may be located at a single geographical location or may be distributed such that network devices of the network are located at different geographical locations.

As described herein, in making the routing decision for a particular data packet, the routing engine may consider particular candidate routes for the data packet, and the select a particular egress port of the source network device associated with one of these candidate routes. The various candidate routes that are considered by the routing engine in making its routing decision may have different associated path lengths, or number of hops. In this context, the "number of hops" refers to the number of remaining hops between the source network device (i.e., the number of hops between the network device making the routing decision, which may be different than the originating network device) and the destination network device. For example implementations that are described herein, the number of hops refers to the number of network device-to-network device channels, or links, traversed by the packet between the source network device and the destination network device. In accordance with further example implementations, the number of hops may be defined as the number of network devices traversed by the packet between the source network device and the destination network device.

As an example, if, for a given candidate route, the packet would be routed from the source network device to a second network device and then from that second network device to the destination network device, two hops are involved. As another example, if, for another given candidate route, the packet would be routed from the source network device to a second network device; from the second network device to a third network device; and then, from the third network device to the destination network device, then the candidate route has three remaining hops.

For a given set of candidate routes for a packet between a source network device and a destination network device, one or multiple of these candidate routes are "minimal" routes. In this context, a "minimal route" is a route that is in the group of candidate routes that have the fewest number of hops. Conversely, the remaining paths of the candidate paths that are not minimal routes are "non-minimal routes." As an example, in accordance with some implementations, the routing engine may assign all candidate routes that have a number of hops less than a certain number of hops to be in a set, or group, of "minimal routes" and assign the remaining candidate routes to a group of "non-minimal routes." As another example, in accordance with further example implementations, the routing engine may consider a "minimal route" to be the route that has the least number of hops, i.e., the shortest path length in terms of hops. Moreover, for a given set of candidate routes, there may not be a single candidate route that is the minimal route. For example, of the given set of candidate routes, three routes may have three hops, and the remaining candidate routes may have more than three hops. As such, for this case, there are three minimal candidate routes.

Regardless of how the routing engine classifies the candidate routes as being minimal or non-minimal, in general, the routing engine bases the classification on the number of hops; the minimal routes have associated hop counts within a first range of smaller hop counts; and the non-minimal routes have associated hop counts within a second range of larger hop counts. For example, the routing engine may set a particular threshold, such as a threshold of "3," and the routing engine may deem candidate routes that have hop counts of "three" or less to be the minimal routes (i.e., within the first range of hop counts); and the routing engine, for this example, may consider the candidate routes that have hop counts greater than "3" to be non-minimal routes (i.e., routes within the second range of hop counts).

In general, a network device may have one or multiple routing engines (each port of the network device may have a routing engine, for example) that select the egress ports for packets that are received by the network device at the network device's ingress ports. In accordance with some implementations, a network device may have a routing engine that is associated with each ingress port of the network device, and each routing engine, in turn, may select the egress ports for packets that are received at the associated ingress port. In this context, the "routing engine", in accordance with example implementations, may represent a combination of hardware and software logic of a network device.

To select the route for a given packet, the routing engine may first identify, or determine, all available candidate routes for an incoming packet to take from the source network device to a destination network device; select one of the candidate routes based on a congestion metric threshold and weight metric values, as described herein. The routing engine may use one or multiple routing tables to select the candidate routes. More specifically, in accordance with example implementations, the routing engine may use an adaptive routing algorithm to select a route (herein called the "selected candidate route" or "selected route") for a given packet. The selection of one of the candidate routes, in turn, involves selection of a particular egress port for that route. It is noted that, depending on the particular implementation, by selecting a particular route, the routing engine may select one or multiple next hops for the packet. In this manner, not only does the selection of the candidate route select a particular egress port of the network device, this selection may, depending on the particular implementation, select one or multiple next hops for the packet.

In accordance with example implementations, the routing engine may determine the candidate routes from one or multiple routing tables and/or forwarding tables that are stored in a memory of the network device containing the routing engine. In general, such tables may contain data representing the network topology near a given network device, such as the addresses of the network devices directly connected to the given network device; addresses of network devices that are not directly connected to the given network device but nevertheless accessible through one or multiple hops; candidate routes through the network devices near the given network device; metrics representing values that characterize approximated conditions of the candidate routes (such as congestion metric values, as further described herein); and so forth.

In general, an adaptive routing algorithm selects between minimal and non-minimal routes according to the current network load. More specifically, adaptive routing algorithms may select minimal routes for load balanced (or mostly load balanced) networks. In this context, a "load balanced network" refers to a network in a state in which data traffic is generally evenly distributed among the different paths, or routes, of the network. Adaptive routing algorithms may select non-minimal routes for purposes of redistributing the network traffic to balance the network.

One type, or category, of adaptive routing algorithms is a "weighted decision" routing adaptive algorithm. When using a weighted decision routing algorithm, the routing engine determines, or calculates, values that represent "weights," or "weight metric values," for each of the candidate routes. A higher weight metric value corresponds to a higher expected delay, or latency, and a lower weight metric value corresponds to a lower expected delay, or latency. The routing engine accordingly may calculate weight metric values for each candidate route and select the candidate route for which the corresponding weight metric value is the smallest.

The weight metric value for a given candidate route may be based on the product of the number of hops of the route and a congestion metric value that represents an approximated, or estimated, congestion of the route (a congestion metric value based on the estimated congestion of the first hop of the route, for example):

$$\text{weight} = \text{congestion} * \text{hopcount}, \qquad \text{Eq. 1}$$

In Eq. 1, "weight" represents a weight metric value for the given candidate route; "congestion" represents a congestion metric value for the candidate route; and "hopcount" represents the number of hops for the candidate route.

Depending on the particular implementation, the weight for a candidate route may be independent of the number of remaining hops for the route. For example, in accordance with example implementations, the weight for a given candidate route may be an approximation of the delay, or latency, for the route; and as further described herein, the approximated delay, or latency, may be imputed to the candidate route based on the delay estimated from the first hop (of the remaining hops) of the candidate route, and consequently, the delay may be independent of the number of hops of the route. As such, the routing engine may calculate the weight as follows:

$$\text{weight} = \text{congestion}. \qquad \text{Eq. 2}$$

There are many ways for the routing engine to determine a congestion metric value for a given candidate route, such as, for example, a technique in which the congestion to the next hop is used to estimate the congestion for the entire candidate route. For example, the routing engine may use a flow control-based scheme in which the routing engine calculates the congestion metric value for a candidate route as the number of credits that the source network device has for a given capacity of the next network device (i.e., the next hop) in the path. More specifically, the routing engine may have a software or hardware counter for the next hop of each candidate route, and the counter may store a value that represents a capacity of the next hop. For example, when the routing engine transmits a unit of packet data (called a "flow control digit," or "flit," herein) to a given next hop, the routing engine may decrement the associated counter (representing a decrease in the capacity of the next hop), and when a buffer credit is received from the next hop representing that a flit has been transmitted by the next hop, the routing engine may increment the associated counter in view of the next hop's buffer capacity increasing. The value of the counter may be used as the congestion metric value.

The routing engine may determine the congestion metric value differently, in accordance with further implementations. For example, in accordance with a further example implementation, the routing engine may determine the congestion metric value for a given candidate route based on the number of flits transmitted to the next hop (for which the routing engine has not received a corresponding credit, which decreases the number). In accordance with further example implementations, the routing engine may determine the congestion metric value based on the percentage of remaining capacity of the downstream queue of the next hop (i.e., the percentage of available capacity in the packet buffer, or queue, of the next network device due to knowledge of the queue of the next hop by adding the flits transmitted and subtracting the credits received). Thus, many possible ways for the routing engine to determine the congestion metric value are contemplated and are within the scope of the appended claims.

Another way for the routing engine to select a route from the candidate routes is to employ a "threshold" algorithm, in which the routing engine does not consider hop counts in the routing decision making process. In this regard, the threshold algorithm involves the routing engine comparing a congestion metric value of the next hop of the candidate route to one or multiple programmable congestion thresholds. As an example, the routing engine may employ a threshold algorithm in which the routing engine compares congestion metric values associated with the candidate routes against a predetermined congestion threshold; and the routing engine may then select any candidate route whose congestion metric value is less than the congestion threshold. The routing engine may alternately use a relatively more complex congestion threshold-based routing decision algorithm in which the routing engine buckets, or groups, the candidate routes into minimal and non-minimal groups; and the routing engine compares the congestion metric values of routes of the different groups against different congestion thresholds. In this manner, the reason why the routing engine may make an incorrect assumption is that a credit (or multiple flits) may be traveling back to the routing engine but these credit flits have not been yet received. As such, the routing engine may assume that the downstream queue is more congested than it actually is, as it takes time for the credit flits to travel back and that is what results in the phantom congestion.

If the routing engine uses a routing decision algorithm that is based solely on weighted metric values, then relatively high channel latencies may induce an effect called "phantom congestion," in which the routing engine selects sub-optimal routes. "Phantom congestion," in general, refers to the appearance of network congestion when the congestion does not really exist or exists to a lesser extent than what is represented by congestion metric values. For example, phantom congestion may arise using the above-described credit-based flow control in which the routing engine debits a counter for a given next hop device when a flit is transmitted by the egress port to the given next hop device and credits the counter when a credit is received from the given next hop device. A relatively long round trip time for the credit-based flow control may cause the routing engine to incorrectly assume a relatively large congestion metric value when the link to the next hop device actually has a relatively low congestion. This is caused by having many flits and/or credits simultaneously "in flight." Although one way to mitigate problems with phantom congestion is to add a constant, or "bias," to the weight metric value to discourage the routing engine from selecting non-minimal routes when a small amount of congestion is experienced, the use of such a bias may cause the routing engine to prefer minimal routes, which does not serve to balance unbalanced networks.

In accordance with example implementations that are described herein, a routing engine uses a hybrid routing decision algorithm, which considers congestion metric thresholds, congestion metric values and weight metric values to optimally select routes for packets in a manner that balance unbalanced networks. Moreover, as discussed herein, a particular advantage of the hybrid routing decision algorithm that is described herein is that in arriving at the routing decision, the routing engine may, in accordance with some implementations, perform zero multiplications, thereby resulting in a relatively less complex design for the routing engine.

In accordance with example implementations, the hybrid packet routing decision algorithm may proceed as follows. In general, the routing engine first decides, based on a congestion metric threshold (also called the "congestion metric threshold" or "congestion threshold" herein), whether to select a minimal route or non-minimal route for the packet. Accordingly, in accordance with example implementations, the routing engine groups, or bucketizes, the candidate routes into two groups (a group of minimal routes and a group of non-minimal routes); selects one of the two groups based on a congestion metric threshold; and then uses weights (e.g., using weight metric values calculated using Eq. 1 or 2, as further described herein) to select one of the candidate routes within the selected group.

Accordingly, if the routing decision for the two groups results in the bypassing of the minimal route(s), then the routing engine selects a non-minimal route based on weight metric values that the routing engine assigns to the non-minimal routes.

More specifically, in accordance with example implementations, the routing engine first compares a congestion metric value of the least congested minimal candidate route to a predetermined congestion metric threshold. In general, the smaller the congestion metric value for a given candidate route, the smaller the estimated congestion for the route; and as a result, the routing decision may result in the selection of more non-minimal routes (as compared to, for example, the bias-based routing decision algorithm mentioned above).

If the congestion metric value for the least congested minimal route is below the congestion metric threshold, then, in accordance with example implementations, the routing engine selects the least congested minimal route as the route for the packet. If, however, in accordance with example implementations, the least congested minimal route has a congestion metric value that surpasses the congestion metric threshold, then, the routing engine selects a non-minimal route based on weight metric values that the engine assigns to the non-minimal routes. In this regard, a group of candidate non-minimal routes may be available for the packet. In accordance with example implementations, to select one of the candidate non-minimal routes, the routing engine determines weight metric values for each of the non-minimal routes and selects the non-minimal route based on a comparative evaluation of these weight metric values (e.g., the routing engine compares the weight metric values to select the non-minimal route corresponding to the least weight, for example).

In accordance with example implementations, the routing engine may set the weight metric values of the non-minimal routes equal to their respective congestion metric values that the routing engine determines based on Eq. 2 above. As such, the weight metric values may be independent of hop count. Moreover, as the weight metric values are set equal to the respective congestion metric values, the routing decision algorithm used by the routing engine may not involve any multiplications, i.e., neither the calculations of the congestion metric values, the calculations of the weight metric values (as being equal to the corresponding congestion metric values), nor the comparisons that are made by the routing engine 112 involves determining a multiplication product.

In accordance with some implementations, the routing engine selects the candidate non-minimal route that has the least estimated congestion (as represented by the corresponding congestion metric value). In accordance with some implementations, the congestion metric value increases with congestion, and accordingly, the routing engine selects the candidate non-minimal route that has the corresponding lowest congestion metric value.

As further described herein, in accordance with further example implementations, the routing engine may calculate weight metric values for the candidate non-minimal routes using Eq. 1 above. As such, the routing engine may assign each non-minimal route a weight metric value, which is proportional or equal to "congestion·hopcount"; and the routing engine selects the non-minimal route that estimates the least latency (i.e., the routing engine selects the non-minimal route having the lowest weight metric value).

As further described herein, in accordance with some implementations, the routing engine may further base the routing decision on multiple congestion metric thresholds for different hop counts (i.e., different congestion metric thresholds for different path distances or hops). For these implementations, the routing engine may select a route for a packet as follows. First, the routing engine compares the congestion metric value for the least congested minimal candidate route against a predetermined congestion metric threshold. Similar to the routing decision making that is described above, if the value of the congestion metric value for the least congested minimal route or candidate route is below a first congestion threshold, then, the routing engine selects the least congested minimal route. If, however, the congestion metric value for the least congested minimal candidate route is above the first congestion threshold, then, in accordance with example implementations, the routing engine may compare the candidate non-minimal routes to different congestion metric thresholds, depending on their respective hop count(s).

For example, in accordance with example implementations, the routing engine may group non-minimal candidate routes that have a path length of one (i.e., one hop) together and compare the congestion metric of the least congested route of that that subgroup to a particular congestion threshold. If the value of the congestion metric of the least congested non-minimal route for the one hop subgroup is below the threshold, then the routing engine selects this route for the packet. However, if the value of the congestion metric is above the congestion threshold, then, in accordance with example implementations, the routing engine may next consider, for example, the subgroup of candidate non-minimal routes that have the next lowest hop count, such as, for example, a subgroup of non-minimal routes that each have a hop count of two. In this manner, the routing engine may compare the value of the congestion metric of the least congested route of the two hop subgroup to a particular congestion threshold, and if the value of the congestion metric is below the congestion threshold, then the routing engine selects the least congested two hop non-minimal route for the packet. If this does not result in a route selection, then the routing engine may consider candidate non-minimal routes having a hop length of three, and so forth.

Figure 1:
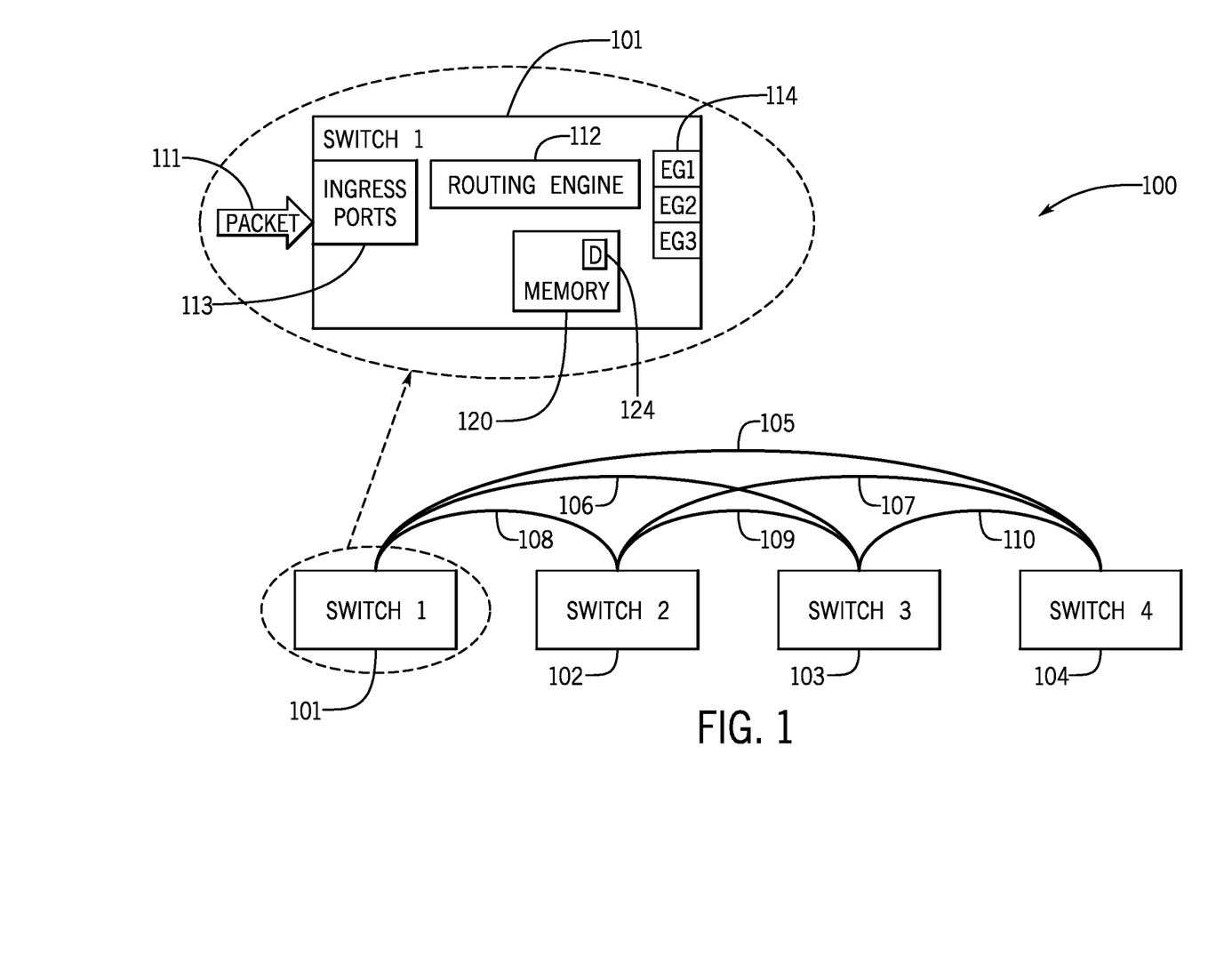
FIGS. 1 and 2 are schematic diagrams of networks having multiple candidate routes for routing packets according to example implementations.

As a more specific example, FIG. 1 depicts a schematic diagram of an example network 100 having a plurality of network devices and in which packets are routed using a hybrid routing decision algorithm that considers both a congestion metric threshold and weighting metrics. For this example, the network 100 includes four example network devices, which, as illustrated in FIG. 1, may be four switches 101, 102, 103 and 104 that are connected to each other, and are also referred to herein as "switch1 101," "switch2 102," "switch3 103," and "switch4 104," respectively. It is understood, however, that the network 100 that is depicted in FIG. 1 may include additional components, and some of the components described herein may be removed and/or modified, in accordance with further implementations.

The switches 101, 102, 103 and 104 are connected to each other, such as connected to each other by network cabling or other connections (electrical traces for an intrachip network, for example). The different connections among the switches 101, 102, 103 and 104 establish different candidate routes for packets. For the example implementations that are described herein, the switch1 101 receives a packet 111 at an ingress port 113, and for the example implementations described herein, the packet 111 is communicated by the switch1 101 to a destination network device, which for this example, is the switch4 104. There are many possible candidate routes for the packet 111 to be routed between the switch1 101 and the switch4 104. In accordance with example implementations, the switch1 101 contains a routing engine 112 that selects a route from these candidate routes for the packet 111. More specifically, in accordance with example implementations, the routing engine 112 applies a hybrid congestion threshold and weighting decision scheme for purposes of selecting a route for the packet 111 for purposes of communicating the packet 111 from the switch1 101 to the switch4 104.

For the example network 100 of FIG. 1, the switch1 101 is connected to each of the switches 102, 103 and 104; i.e., the switch1 101 is connected to the switch2 102 by a connection 108, the switch1 101 is connected to the switch3 103 by a connection 106, and the switch1 101 is connected to the switch4 104 by a connection 105. Moreover, the switch2 102 and the switch3 103 are connected by a connection 109; the switch3 103 and the switch4 104 are connected by a connection 110; and the switch2 102 and the switch4 104 are connected by a connection 107. As such, there are several candidate routes for the packet 111. The minimal candidate route, i.e., the candidate route having the least number of hops, is the candidate route using connection 105, i.e., the direct connection from the switch1 101 to the switch4 104. There are two non-minimal routes involving two hops: a first candidate route that includes the connections 108 and 107; and another non-minimal candidate route that includes the connections 106 and 110. Additionally, the longest potential candidate path that involves three hops: the candidate route that includes connections 108, 109 and 110.

For the example of FIG. 1, the switch1 101 has three egress ports 114, and each of the egress ports 114 is connected to a different switch: switch2 102, switch3 103 or switch4 104. The routing engine 112 of the switch1 101, in accordance with example implementations, determines, or selects, the route for the packet 111 by first considering the minimal route formed by the connection 105 between the switch1 101 and the switch4 104. In this manner, in accordance with example implementations, the routing engine 112 compares a value of a congestion metric associated with this minimal route to a predetermined congestion metric threshold. For example, the congestion metric value may correspond to a congestion of 70%, and the congestion metric threshold may correspond to a congestion of 60%. For this example, as a result of the comparison, the routing engine 112 does not select the candidate minimal route. As such, in accordance with example implementations, the routing engine 112 next considers the group of candidate non-minimal routes. In accordance with example implementations, the routing engine 112 may use weighting-based criteria to select one of the candidate non-minimal routes. For example, in accordance with some implementations, the routing engine 112 may assign weights to the respective non-minimal routes equal to the congestion metric values for the routes and select the non-minimal route that has the lowest congestion metric value. In accordance with further example implementations, the routing engine 112 may multiply the number of hops, or path length, of each candidate non-minimal route with its associated congestion metric value to derive a weight, and the routing engine 112 may then select the candidate non-minimal route having the lowest weight. In other words, in accordance with example implementations, the routing engine 112 selects the egress port 114 associated with the candidate non-minimal route having the lowest weight.

Figure 3:
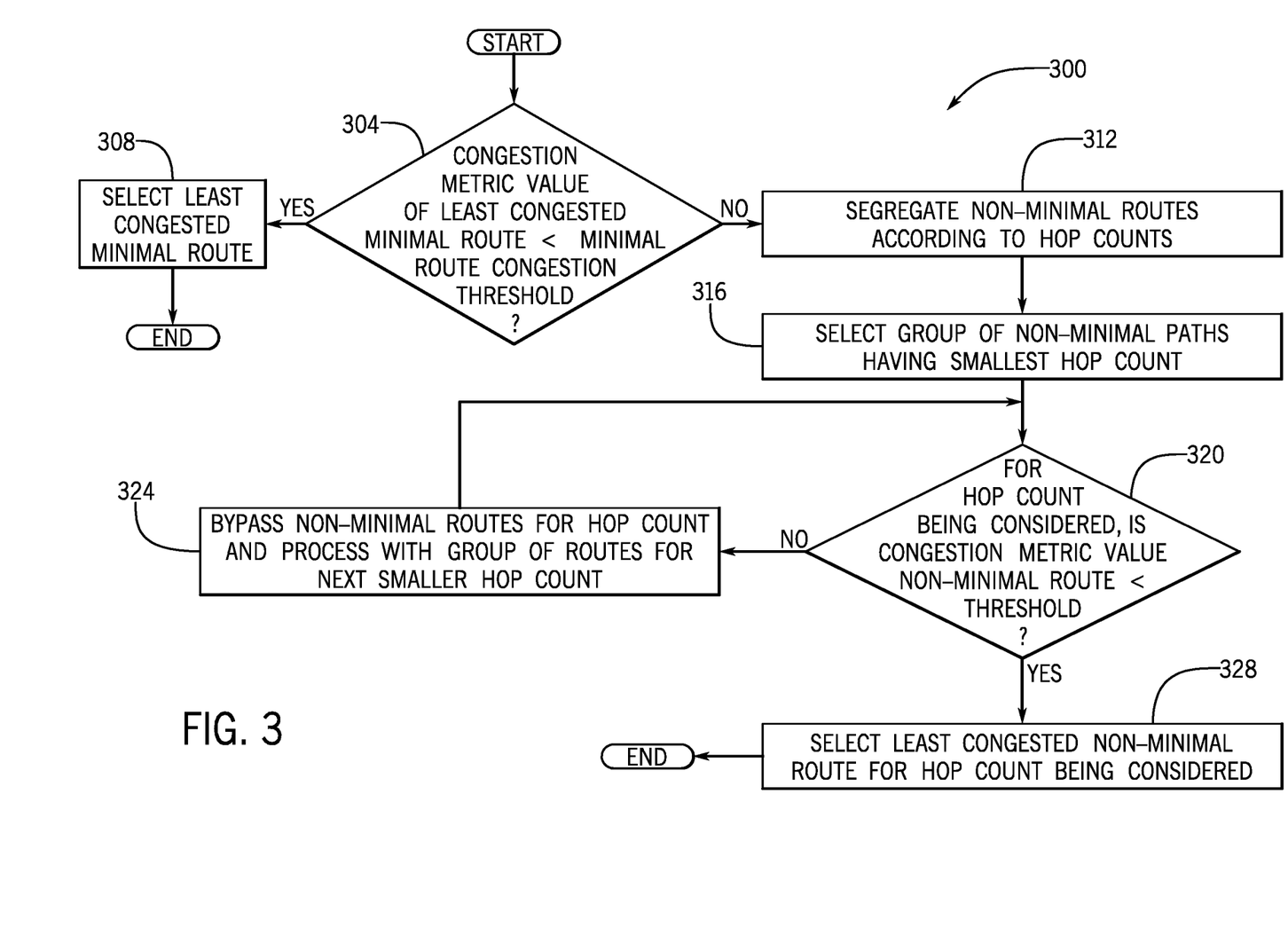
FIG. 3 is a flow diagram depicting a packet routing technique that considers congestion metrics, a congestion metric threshold and weighting metrics according to an example implementation.

In accordance with further example implementations, the routing engine 112 may apply a technique 300 that is depicted in FIG. 3, in which multiple congestion thresholds are considered. More specifically, referring to FIG. 3 in conjunction with FIG. 1, in accordance with some implementations, the routing engine 112 may determine (decision block 304) whether the congestion metric value of the least congested minimal route is less than a predetermined minimal route congestion threshold. If so, then as depicted in block 308, the routing engine 112 may then select the least congested minimal route for the packet 111 and accordingly, select the egress port 114 corresponding to the selected route.

If, however, the least congested minimal route has a congestion metric value that is greater than the minimal route threshold, then, in accordance with example implementations, the routing engine 112 may separate, or segregate the candidate non-minimal routes according to their respective path lengths, or hop counts, pursuant to block 312. In this manner, in accordance with some implementations, the routing engine 112 may group non-minimal routes having a hop count of two together (such as the non-minimal route formed from the connections 106 and 110 and the non-minimal route formed from the connections 108 and 107, for example); group candidate non-minimal routes having a hop length of three together (such as the non-minimal route formed from the connections 108, 109 and 110, for example); and so forth. The routing engine 112 may then, starting with the group having the lowest hop count, or path length, compare the congestion metric value of the least congested non-minimal route of the group to a congestion threshold associated with the group. In this manner, as depicted in FIG. 3, the routing engine 112 may select (block 316) the group of non-minimal paths having the smallest hop count and then determine (decision block 320) for the hop count being considered, whether the congestion metric threshold of the least congested non-minimal route of the group is less than a congestion threshold for the group. If so, then this least congested non-minimal route is selected for the packet, pursuant to block 328. Otherwise, pursuant to block 324, the routing engine 112 bypasses the non-minimal routes for this group and proceeds with the group of routes for the next shortest hop count. In other words, control returns to decision block 320 to consider the congestion of the least congested non-minimal route for the group corresponding to the next smallest hop count.

Referring back to FIG. 1, in accordance with example implementations, the routing engine 112 may be formed by one or multiple physical hardware processors (one or multiple central processing units (CPUs), one or multiple CPU cores, and so forth) executing machine executable instructions, or "software." In this manner, in accordance with some implementations, a local memory 120 of the switch1 101 may store machine executable instructions that are executed by the processor(s) for purposes of implementing the routing. In general, the local memory 120 is a non-transitory memory that may be formed from, as examples, semiconductor storage devices, phase change storage devices, magnetic storage devices, memristor-based devices, a combination of storage devices associated with multiple storage technologies, and so forth. Regardless of its particular form, the memory 120 may store various data 124 (data representing routing tables, congestion thresholds, hop count groupings, and so forth).

In accordance with some implementations, the routing engine 112 may be implemented at least in part by a hardware circuit that does not include a processor executing machine executable instructions. In this regard, in accordance with some implementations, the routing engine 112 may be formed in whole or in part by a hardware processor that does not execute machine executable instructions, such as, for example, an application specific integrated circuit (ASIC), a field programmable gate array (FPGA), and so forth. Thus, many implementations are contemplated, which are within the scope of the appended claims.

While the network 100 that is depicted in FIG. 1 includes four switches, the network 100 may include any other network topology and any number of switches or routers connected to each other. Although FIG. 1 depicts a detailed view of the switch1 101, the switches 102, 103 and 104 may, in accordance with example implementations, contain elements similar to the elements depicted for the switch1 101. Moreover, in accordance with example implementations, the switches 101, 102, 103 and 104 may include additional components, such as routing tables, memories, controllers and other computing resources.

Figure 2:
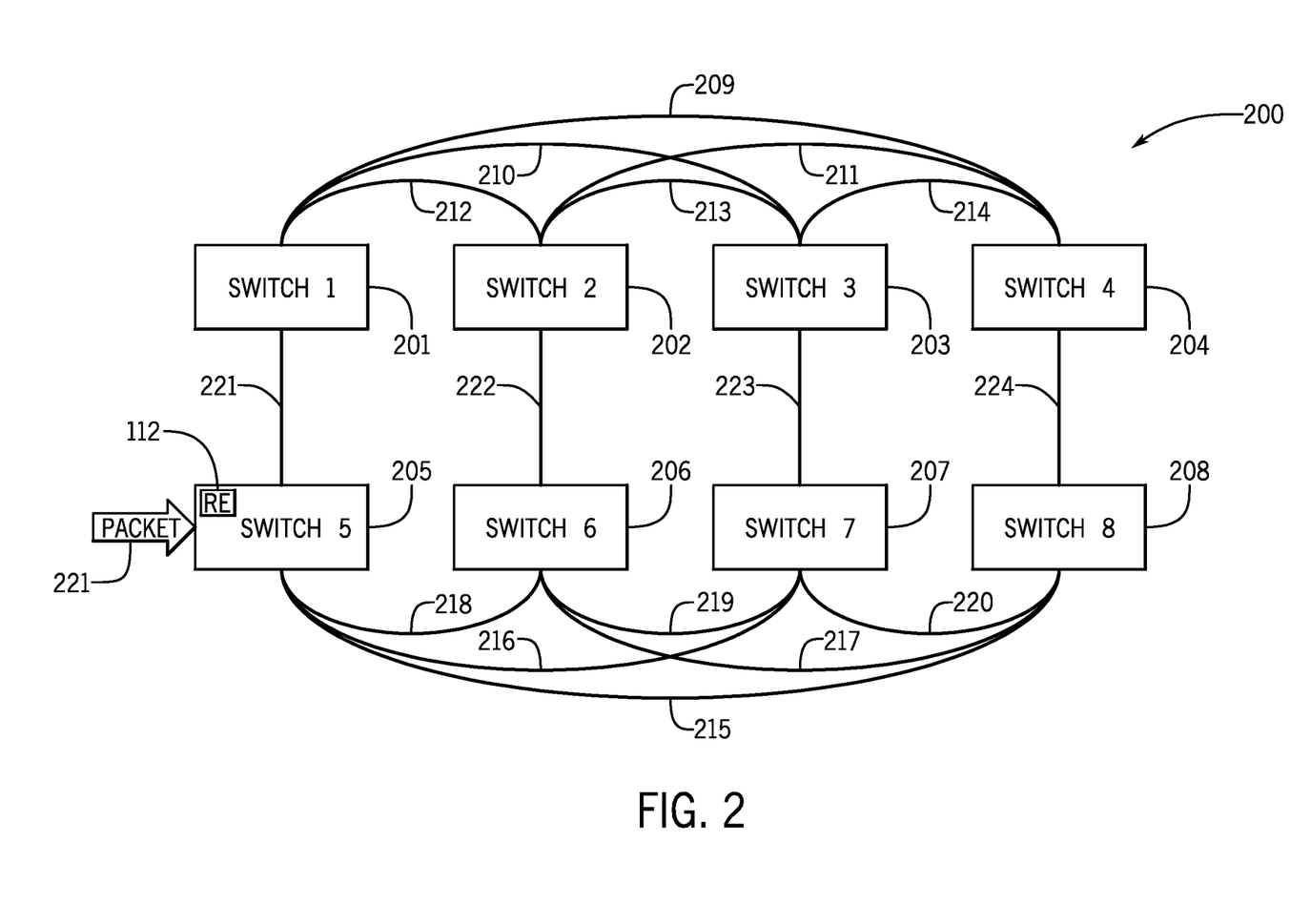

FIG. 2 is a schematic diagram of an example four-by-two (4:2) network 200 in which packets are routed using the techniques that are described herein, in accordance with further example implementations. It should be understood that the network 200 that is depicted in FIG. 2 may include additional components, and some of the components described herein may be removed and/or modified, in accordance with further example implementations.

The network 200 includes eight switches 201-208 that are connected to each other. For the example depicted in FIG. 2, the switch5 205 is the source switch, and the switch4 204 is the destination switch for a packet 221 that is received at the switch5 205. After the packet 221 is received at the switch5 205, a routing engine 112 of the switch5 205 determines the candidate routes for the packet 221 to be forwarded to the switch4 204. As depicted in FIG. 2, the switch1 201 is connected to the switch5 205 by a connection 221; the switch2 202 is connected to the switch6 206 by a connection 222; the switch3 203 is connected to the switch7 207 by a connection 223; and the switch4 204 is connected to the switch8 208 by a connection 224. Moreover, various other connections are formed between the switches 201 to 208. As examples, the switch1 201 is connected to the switch2 202, the switch3 203 and the switch4 204 by corresponding connections 212, 210 and 209, respectively. The switch5 205 is connected to the switch6 206, the switch7 207 and the switch8 208 by connections 218, 216 and 215, respectively. Moreover, the switch2 202 is connected to the switch3 203 by a connection 213; and the switch6 206 is connected by a connection 219 to the switch7 207.

With all of these connections, there are multiple candidate routes for routing the packet 221 from the switch5 205 (the source network device receiving the packet 221) to the switch4 204 (the destination network device). In this manner, for the example case depicted in FIG. 2, the routing engine 112 of the switch5 205 may identify two minimal candidate routes, which each involve two hops: minimal candidate route traversing the connection 221 and the connection 209; and minimal candidate route traversing the connection 215 and the connection 224. Moreover, there are multiple candidate non-minimal routes having different hop counts.

As an example of a routing decision made by the routing engine 112 for the packet 221, the routing engine 112 may compare congestion metric values for the two minimal candidate routes: a first congestion metric value for the route traversing the connections 221 and 209; and a second congestion metric value for the route traversing the connections 215 and 224. As an example, the routing engine 112 may calculate the first congestion metric value based on the congestion at the first hop (switch1 201) of the corresponding minimal route; and the routing engine 112 may calculate the second congestion metric value based on the congestion at the first hop (switch8 208) of the corresponding minimal route. As described above, the first and second congestion metric values may be based on the number of flit credits/debits with the switch1 201 and switch8 208, respectively. For this example, the first congestion metric value may correspond to a congestion of 30%, and the second congestion metric threshold may correspond to a congestion of 40%. Moreover, for this example, the congestion metric threshold may be 50%. Accordingly, for this example, the routing engine 112 may select the least congested minimal route, i.e., route traversing the connection 221 and the connection 209.

Figure 4:
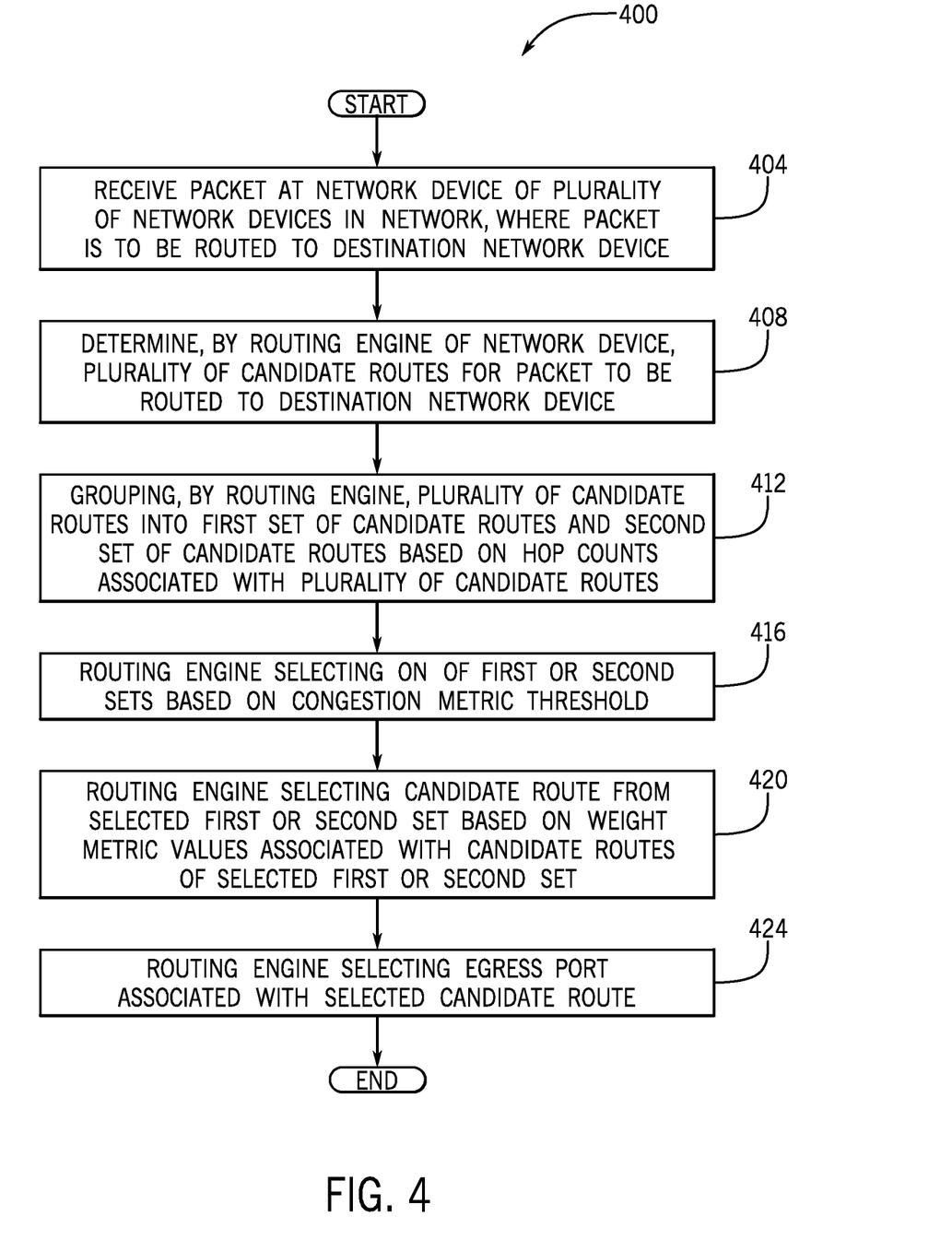
FIG. 4 is a flow diagram depicting a technique to route a packet to a destination network device according to an example implementation.

Referring to FIG. 4, thus, in accordance with example implementations, a technique 400 includes receiving (block 404) a packet at a network device of a plurality of network devices in a network. The packet is to be routed to a destination network device. The technique 400 includes determining (block 408), by a routing engine of the network device, a plurality of candidate routes for the packet to be routed to the destination network device; and grouping (block 412), by the routing engine, the plurality of candidate routes into a first set of candidate routes and a second set of candidate routes based on hop counts that are associated with the plurality of candidate routes. The technique 400 includes the routing engine selecting (block 424) an egress port of the network device associated with the selected candidate route. The technique 400 includes the routing engine selecting (block 424) the egress port that is associated with the selected candidate route.

Figure 5:
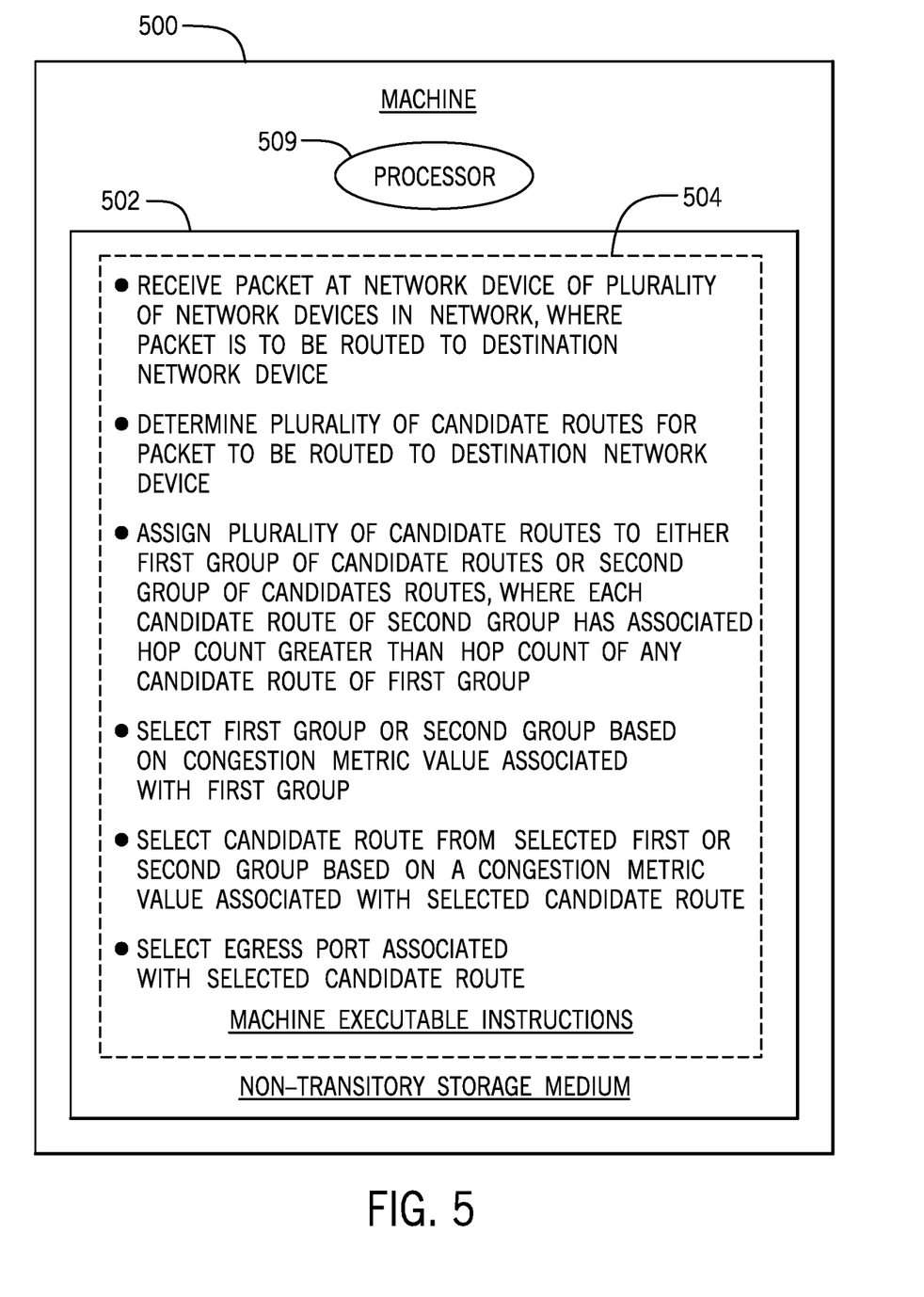
FIG. 5 is an illustration of a non-transitory storage medium storing instructions that may be executed by a machine to route a packet to a destination network device according to an example implementation.

Referring to FIG. 5, in accordance with example implementations, a machine 500 includes at least one processor 509 (e.g., one or multiple CPUs or CPU cores) and a non-transitory machine readable storage medium 502 that incudes instructions 504, that, when executed by the processor(s) 509, cause the processor 509 to receive a packet at a network device of a plurality of network devices in a network. The packet is to be routed to a destination network device. The instructions, when executed by the processor(s) 509, cause the processor(s) 509 to determine a plurality of candidate routes for the packet to be routed to the destination network device; and assign the plurality of candidate routes to either a first group of candidate routes or a second group of candidate routes, where each of the candidate routes of the second group has an associated hop count that is greater than the hop count of any of the candidate routes of the first group. The instructions, when executed by the processor(s) 509, cause the processor(s) 509 to select the first group or the second group based on a congestion metric value that is associated with the first group; select a candidate route from the selected first set or second set based on a congestion metric value that is associated with the selected candidate route; and select an egress port associated with the selected candidate route.

Figure 6:
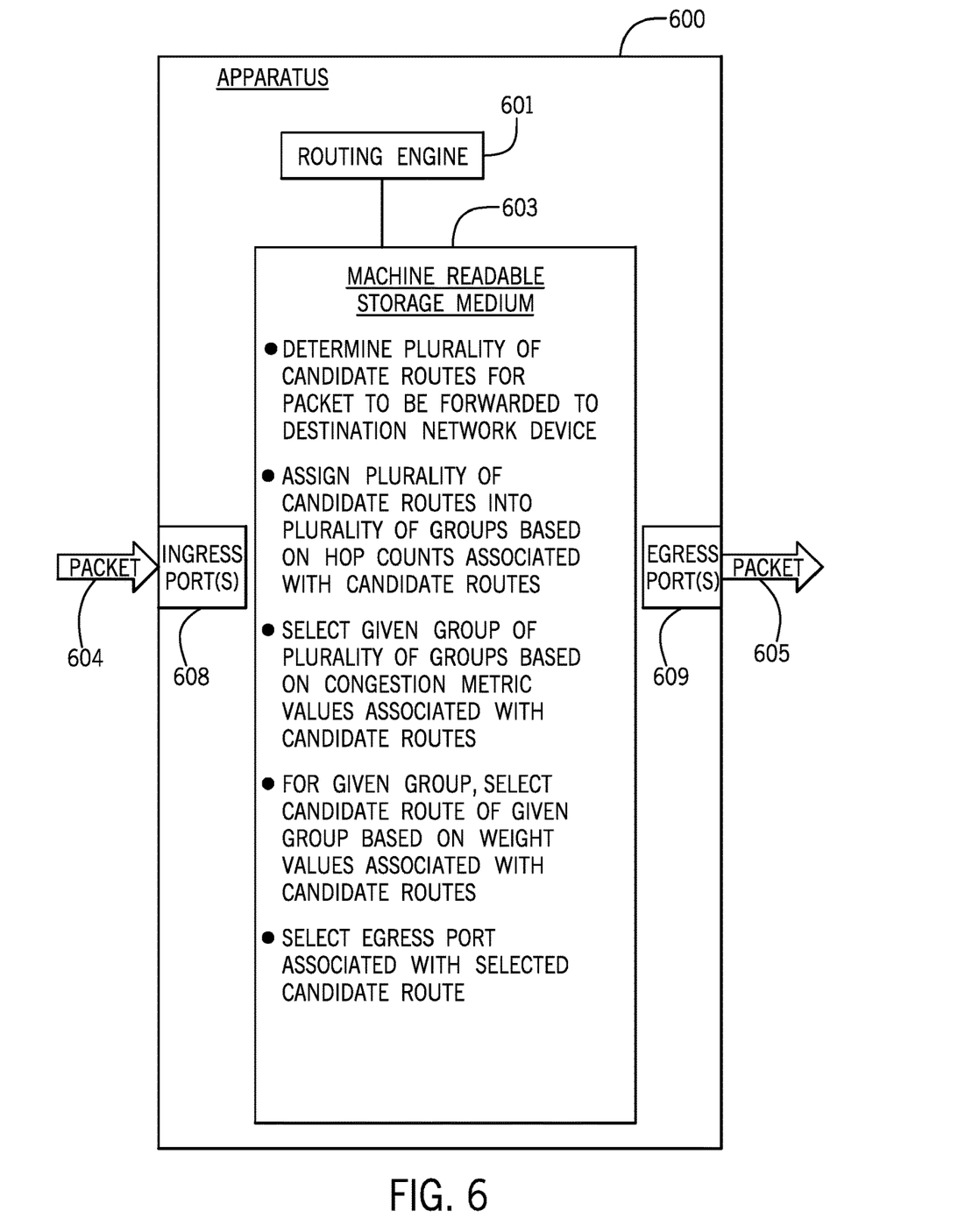
FIG. 6 is a schematic diagram of an apparatus to route a packet to a destination network device according to an example implementation.

Referring to FIG. 6, in accordance with example implementations, an apparatus 600 includes at least one ingress port 608 through which a packet is received; at least one egress port 609 through which the packet is forwarded to a destination network device, as depicted at reference numeral 605; and a routing engine 601. The routing engine 601 determines a plurality of candidate routes for the packet to be forwarded to the destination network device; assigns the plurality of candidate routes into a plurality of groups based on hop counts that are associated with the candidate routes; selects a given group of the plurality of groups based on congestion metric values that are associated with the candidate routes; for the given group, selects a candidate route of the given group based on a weight metric value that is associated with the selected candidate routes; and selects an egress port 609 associated with the selected candidate route.

While the present disclosure has been described with respect to a limited number of embodiments, those skilled in the art, having the benefit of this disclosure, will appreciate numerous modifications and variations therefrom. It is intended that the appended claims cover all such modifications and variations.

What is claimed is:
1. A method comprising:
receiving a packet at a network device of a plurality of network devices in a network, wherein the packet is to be routed to a destination network device;
determining a plurality of candidate routes for the packet to be routed to the destination network device, each candidate route in the plurality of candidate routes is a respective route from the network device to the destination network device;
grouping the plurality of candidate routes into a first group of candidate routes and a second group of candidate routes, wherein:
the first group of candidate routes correspond to routes with a minimal hop route having a fewest number of hops, and
the second group of candidate routes do not correspond with the minimal hop route;
calculating a first weight metric value for the first group of candidate routes,
wherein the first weight metric value is calculated by multiplying the fewest number of hops and a congestion metric value stored in memory, wherein the congestion metric value stored in memory is based on a queue capacity associated with a next hop for at least one route of the first group of candidate routes;
comparing the first weight metric value with a congestion metric threshold; and
in response to determining the first weight metric value is greater than the congestion metric threshold:
assigning a second weight metric value to a first route in the second group of candidate routes;
assigning a third weight metric value to a second route in the second group of candidate routes; and
selecting a particular route in the second group of candidate routes based on a comparison of the second weight metric value to the third weight metric value, wherein the particular route is used to route the packet to the destination network device.

2. The method of claim 1, wherein:
the first group of candidate routes comprises candidate routes having associated hop counts within a first range of hop counts;
the second group of candidate routes comprises candidate routes having associated hop counts within a second range of hop counts; and
a minimum hop count of the second range of hop counts is larger than a maximum hop count of the first range of hop counts.

3. The method of claim 1, further comprising:
determining the second weight metric value based on congestion metric values associated with the second group of candidate routes.

4. The method of claim 1, wherein the second group of candidate routes comprises a first subgroup of the plurality of candidate routes associated with a first hop count and a second subgroup of the plurality of candidate routes associated with a second hop count greater than the first hop count.

5. The method of claim 1, further comprising:
bypassing the first group of candidate routes based on comparing the first weight metric value to a second congestion metric threshold.

6. The method of claim 1, wherein the network device is a switch, wherein the packet is received using an ingress port of the switch, and an egress port of the switch through which the packet is transmitted along the particular route in the second group of candidate routes.

7. The method of claim 1, wherein the second group of candidate routes correspond with greater than three hop counts.

8. The method of claim 1, further comprising:
transmitting a unit of packet data from the packet to a next hop; and
decrementing a counter representing capacity of the next hop, wherein the counter is associated with the congestion metric value stored in the memory.

9. The method of claim 1, further comprising:
receiving a unit of packet data from the packet from a next hop; and
incrementing a counter representing capacity of the next hop, wherein the counter is associated with the congestion metric value stored in the memory.

10. The method of claim 1, wherein the fewest number of hops includes at least two hops.

11. The method of claim 1, wherein each of the plurality of candidate routes are paths that start at the network device and end at the destination network device.

12. A non-transitory machine readable storage medium comprising instructions that, when executed by at least one processor, cause the at least one processor to:

receive a packet at a network device of a plurality of network devices in a network, wherein the packet is to be routed to a destination network device;
determine a plurality of candidate routes for the packet to be routed to the destination network device, each candidate route in the plurality of candidate routes is a respective route from the network device to the destination network device;
assign the plurality of candidate routes to either a first group of candidate routes or a second group of candidate routes, wherein:
the first group of candidate routes correspond to routes with a minimal hop route having a fewest number of hops, and
the second group of candidate routes do not correspond with the minimal hop route;
calculate a first weight metric value for the first group of candidate routes,
wherein the first weight metric value is calculated by multiplying the fewest number of and a congestion metric value stored in memory, wherein the congestion metric value stored in memory is based on a queue capacity associated with a next hop for at least one route of the first group of candidate routes;
compare the first weight metric value with a congestion metric threshold; and
in response to determining the first weight metric value is greater than the congestion metric threshold:
assign a second weight metric value to a first route in the second group of candidate routes;
assign a third weight metric value to a second route in the second group of candidate routes; and
select a particular route in the second group of candidate routes based on a comparison of the second weight metric value to the third weight metric value, wherein the particular route is used to route the packet to the destination network device.

13. The storage medium of claim 12, wherein the congestion metric value stored in memory is based on a flow control digit associated with the next hop for the at least one route of the first group of candidate routes.

14. An apparatus comprising:
at least one ingress port through which a packet is received;
a plurality of egress ports;
at least one processor; and
a non-transitory machine readable storage medium comprising instructions that, when executed by the at least one processor, cause the at least one processor to:
determine a plurality of candidate routes for the packet to be forwarded to a destination network device, each candidate route in the plurality of candidate routes is a respective route from the network device to the destination network device;
assign the plurality of candidate routes into a first group of candidate routes or a second group of candidate routes, wherein:
the first group of candidate routes correspond to routes with a minimal hop route having a fewest number of hops, and
the second group of candidate routes do not correspond with the minimal hop route;
calculate a first weight metric value for the first group of candidate routes,
wherein the first weight metric value is calculated by multiplying the fewest number of hops and a congestion metric value stored in memory, wherein the congestion metric value stored in memory is based on a queue capacity associated with a next hop for at least one route of the first group of candidate routes;

compare the first weight metric value with a congestion metric threshold; and in response to determining the first weight metric value is greater than the congestion metric threshold:

assign a second weight metric value to a first route in the second group of candidate routes;

assign a third weight metric value to a second route in the second group of candidate routes; and select a particular route in the second group of candidate routes based on a comparison of the second weight metric value to the third weight metric value, wherein the particular route is used to route the packet to the destination network device.

* * * * *